(12) United States Patent
Fujii

(10) Patent No.: US 10,245,691 B2
(45) Date of Patent: Apr. 2, 2019

(54) CONTROLLER FOR MACHINE TOOL

(71) Applicant: FANUC Corporation, Yamanashi (JP)

(72) Inventor: Takaaki Fujii, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 198 days.

(21) Appl. No.: 15/177,390

(22) Filed: Jun. 9, 2016

(65) Prior Publication Data
US 2016/0361788 A1 Dec. 15, 2016

(30) Foreign Application Priority Data

Jun. 15, 2015 (JP) .................................. 2015-120645

(51) Int. Cl.
B23Q 3/157 (2006.01)
B23Q 11/10 (2006.01)
(Continued)

(52) U.S. Cl.
CPC ........ *B23Q 3/1552* (2013.01); *B23Q 11/0042* (2013.01); *B23Q 11/1015* (2013.01);
(Continued)

(58) Field of Classification Search
CPC . Y10T 408/44; Y10T 408/45; Y10T 408/453; Y10T 408/455; Y10T 408/458;
(Continued)

(56) References Cited

U.S. PATENT DOCUMENTS 4,529,340 A * 7/1985 O'Dell ................... B23Q 11/10
184/6.4
5,678,466 A * 10/1997 Wahl ...................... B23D 59/02
408/61
(Continued)

FOREIGN PATENT DOCUMENTS

CN 202070950 U 12/2011
CN 203317137 U 12/2013
(Continued)

OTHER PUBLICATIONS

Decision to Grant a Patent in JP Application No. 2015-120645, dated Jun. 27, 2017, 6 pp.
(Continued)

*Primary Examiner* — Erica E Cadugan
*Assistant Examiner* — Michael Vitale
(74) *Attorney, Agent, or Firm* — Hauptman Ham, LLP

(57) ABSTRACT

The controller for a machine tool according to the present invention makes it possible to discharge both a coolant and an oil mist from a through hole provided in the tool equipped to a main axis of a machine tool, allows a processing program to instruct the discharge of either the coolant or the oil mist, and carries out such a control that a state where the above-described tool is detached from the main axis is maintained during a predetermined period of time at the time of replacing the tool, and at the same time, the oil mist is discharged from the above-described oil mist unit so as to remove the coolant from the above-described piping during the predetermined period of time.

2 Claims, 4 Drawing Sheets

(51) Int. Cl.
*B23Q 3/155* (2006.01)
*B23Q 11/00* (2006.01)

(52) U.S. Cl.
CPC ....... *B23B 2250/12* (2013.01); *B23B 2270/28* (2013.01); *B23C 2250/12* (2013.01); *G05B 2219/35181* (2013.01); *G05B 2219/49049* (2013.01); *G05B 2219/50255* (2013.01); *Y10T 408/455* (2015.01); *Y10T 409/304032* (2015.01); *Y10T 483/15* (2015.01)

(58) Field of Classification Search
CPC . Y10T 409/303976; Y10T 409/304032; Y10T 483/15; B23Q 3/1552; B23Q 11/10; B23Q 11/1015; B23Q 11/1023
USPC ......... 483/13; 409/135, 136; 408/56, 57, 59, 408/60, 61
See application file for complete search history.

(56) References Cited

U.S. PATENT DOCUMENTS

| | | | | |
|---|---|---|---|---|
| 5,800,104 A | * | 9/1998 | Miyano | B01D 21/32 210/167.02 |
| 6,059,702 A | * | 5/2000 | Winkler | B23Q 3/157 408/56 |
| 6,409,641 B1 | * | 6/2002 | Hashimoto | B23Q 3/1552 408/56 |
| 2002/0007706 A1 | | 1/2002 | Hattori | |
| 2008/0213056 A1 | * | 9/2008 | Katoh | B23B 41/02 409/136 |
| 2012/0080098 A1 | | 4/2012 | Makiyama et al. | |
| 2014/0338765 A1 | | 11/2014 | Kono et al. | |
| 2015/0362001 A1 | | 12/2015 | Nakamura et al. | |

FOREIGN PATENT DOCUMENTS

| | | |
|---|---|---|
| CN | 103796795 A | 5/2014 |
| DE | 19915265 A1 | 6/2000 |
| JP | H02-250702 A | 10/1990 |
| JP | 11-333662 A | 12/1999 |
| JP | 2000-5975 A | 1/2000 |
| JP | 2000-126983 A | 5/2000 |
| JP | 2000-126984 A | 5/2000 |
| JP | 2000126983 A * | 5/2000 |
| JP | 2007-290113 A | 11/2007 |
| JP | 2008-296322 A | 12/2008 |
| JP | 2014-151387 A | 8/2014 |
| WO | 98/23384 A1 | 6/1998 |
| WO | 2010/137409 A1 | 12/2010 |

OTHER PUBLICATIONS

Office Action in CN Application No. 201610425252.8, dated Apr. 3, 2018, 16pp.
Examination Report in DE Application No. 102016110541.4, dated Oct. 29, 2018, 9pp.

* cited by examiner

CONTROLLER FOR MACHINE TOOL

RELATED APPLICATIONS

The present application claims priority to Japanese Application Number 2015-120645, filed Jun. 15, 2015, the disclosure of which is hereby incorporated by reference herein in its entirety.

BACKGROUND OF THE INVENTION

1. Field of the Invention

The present invention relates to a controller for a machine tool where the tool replacing control can be carried out when oil mist for internal oil supply and a center through coolant are both used in a cutting process using a machine tool.

2. Description of the Related Art

Japanese Unexamined Patent Publication H2 (1990)-250702 discloses a cutting method according to which a coolant is directly supplied to the edge from a through hole (which is referred to as an oil hole) at the tip of the tool through a center through main axis in a cutting process using a machine tool, which is generally referred to as a center through process. Center through processes make it possible to dramatically increase the coolability and the lubricity at the cutting point, and as shown in WO98/23384, an oil mist is supplied through the pipe of the center through main axis so as to supply the oil mist to the edge instead of a coolant, depending on the machine tool.

Meanwhile, Japanese Unexamined Patent Publication 2007-290113 (turret type tool replacing unit in FIG. 2 (*d*)) and Japanese Unexamined Patent Publication 2008-296322 (swing arm type tool replacing unit in FIG. 10) disclose an example of a tool replacing unit equipped in a machine tool.

In the case where a coolant and an oil mist are both used and pass through the same pipe, the coolant remaining within the pipe is first discharged from the through hole at the tip of the tool when the oil mist is discharged, and thus, such a problem arises that a coolant is used for the process irrelevant of the fact that the cutting requires oil mist.

In many cases, the cutting conditions when an oil mist is used are different from the conditions for processing when a coolant is used, and therefore, processing in the state where a coolant is being discharged from the pipe under the cutting conditions for the use of an oil mist (cutting conditions that are not suitable for a coolant) results in damage to the edge.

In order to solve this problem, the prior art provides a technique for putting the process in a stand-by state for a certain period of time until the remaining coolant has been discharged. However, the remaining coolant is discharged over a long period of time depending on the length of the pipe and the diameter of the oil hole of the tool, which makes the stand-by state last over a long period of time.

SUMMARY OF THE INVENTION

In view of the above-described problem with the prior art, an object of the present invention is to provide a controller for a machine tool that allows the coolant remaining within the pipe to be removed simultaneously as the tool is being replaced when the coolant is switched to an oil mist in the machine tool where a coolant and an oil mist can both be supplied to the same pipe connected to the main axis.

A controller for a machine tool according to the present invention is provided with a coolant unit for storing a coolant and an oil mist unit for generating an oil mist having piping for supplying both the coolant and the oil mist to the same main axis, where the coolant and the oil mist can both be discharged from a through hole provided in the tool that is equipped to the above-described main axis, and a processing program can instruct the discharge of either the coolant or the oil mist, and is characterized by having: a tool replacement confirming means for confirming the existence of a tool replacing instruction in the above-described processing program; an oil mist instruction confirming means for confirming the existence of an oil mist discharge instruction between the above-described tool replacing instruction and the next tool replacing instruction; and a tool replacement time discharging means for maintaining a state where the above-described tool is detached from the above-described main axis during a predetermined period of time at the time of replacing the tool, and at the same time discharging the oil mist from the above-described oil mist unit, and thus removing the coolant from the above-described piping during the predetermined period of time in the case where the above-described oil mist instruction confirming means confirms an oil mist discharge instruction.

Another controller for a machine tool according to the present invention is provided with a coolant unit for storing a coolant and an oil mist unit for generating an oil mist with piping for supplying both the coolant and the oil mist to the same main axis, where the coolant and the oil mist can both be discharged from a through hole provided in the tool that is equipped to the above-described main axis, and a processing program can instruct the discharge of either the coolant or the oil mist, and is characterized by having: a suction unit that can suck up the coolant remaining in the above-described piping; a tool replacement confirming means for confirming the existence of a tool replacing instruction in said processing program; an oil mist instruction confirming means for confirming the existence of an oil mist discharge instruction between the above-described tool replacing instruction and the next tool replacing instruction; and a tool replacement time discharging means for maintaining a state where the above-described tool is detached from the above-described main axis during a predetermined period of time at the time of replacing the tool, and at the same time allowing the above-described suction unit to suck up the coolant from the above-described piping so that the coolant is removed from the above-described piping during the predetermined period of time in the case where the above-described oil mist instruction confirming means confirms an oil mist discharge instruction.

In a machine tool where a coolant and an oil mist can both be supplied to the same pipe connected to the main axis, the present invention can provide a controller for a machine tool that allows the coolant remaining within the pipe to be removed simultaneously as the tool is being replaced when the coolant is switched to an oil mist.

BRIEF DESCRIPTION OF THE DRAWINGS

The above-described and other objects and features of the present invention will be clarified from the following descriptions of the embodiments in reference to the accompanying drawings, from among which.

DETAILED DESCRIPTION OF THE PREFERRED EMBODIMENTS

In the following, the embodiments of the present invention are described in reference to the drawings.

Figure 1:
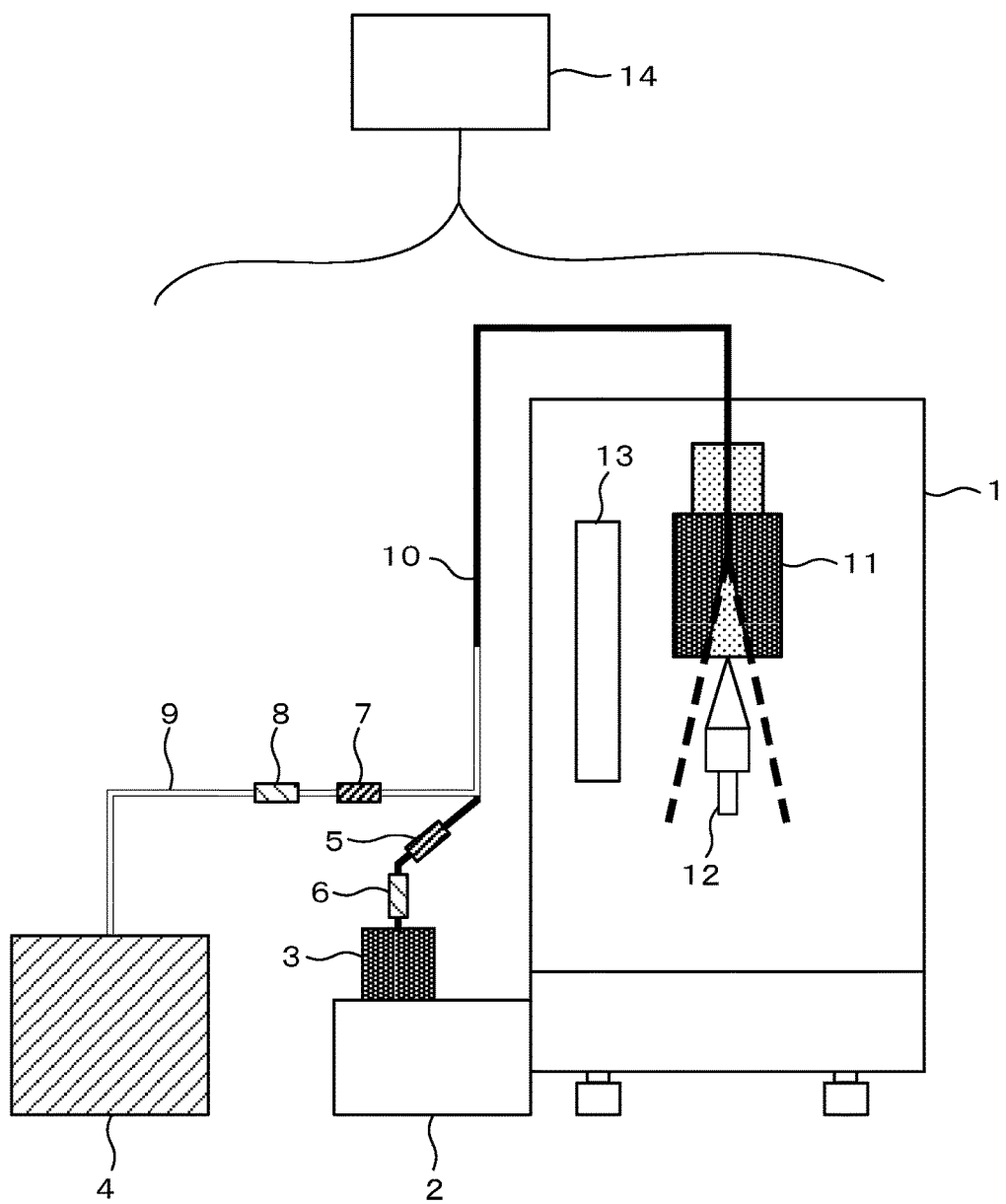
FIG. 1 is a diagram showing the configuration having piping where a center through coolant and an oil mist are both used, and the coolant is discharged from the piping.

FIG. 1 is a diagram showing the configuration having piping where a center through coolant and an oil mist are both used, and the coolant is discharged from the piping. A coolant tank 2 installed adjacent to the main body 1 of a machine tool is equipped with a center through coolant pump 3, which can suck up the coolant with which the coolant tank 2 is filled in. A controller 14 controls the main body 1 of the machine tool so as to process a work in accordance with a processing program. In addition, the controller 14 totally controls the peripheral units including a tool replacing unit 13, the center through coolant pump 3 and an oil mist unit 4.

When the processing program issues a center through coolant instruction, the controller 14 allows the center through coolant pump 3 to be driven and rotated so that the coolant within the coolant tank 2 is sucked up, and the sucked up coolant passes through a first check valve 6 and a first electromagnetic valve 5 so as to reach a center through coolant pipe 10.

When the center through coolant instruction is carried out, a second electromagnetic valve 7 equipped along an oil mist pipe 9 on the oil mist unit 4 side is closed as a result of the control for preventing backflow towards the oil mist unit 4. As a precaution, a second check valve 8 is attached along the oil mist pipe 9 so that backflow can be prevented even in the case where the second electromagnetic valve 7 causes a malfunction. The coolant that has been sucked up from the coolant tank 2 passes through the pipe in the main axis 11 so as to be discharged from the tip of the tool 12.

When an oil mist instruction is carried out, the first electromagnetic valve 5 equipped along the center through coolant pipe 10 on the center through coolant pump 3 side is closed as a result of the control for preventing backflow towards the center through coolant pump 3, and in addition, the oil mist is discharged from the oil mist unit 4. As a precaution, the first check valve 6 is attached along the center through coolant pipe 10 so that backflow can be prevented even in the case where the first electromagnetic valve 5 causes a malfunction.

The oil mist supplied from the oil mist unit 4 passes through the pipe in the main axis 11 so as to be discharged from the tip of the tool 12. In the case where the directly precedent process is a center through coolant process, the possibility of the coolant remaining within the pipe is high at the time of the oil mist instruction, and therefore, the remaining coolant is discharged for a certain period of time.

In order to solve this problem with a machine tool where a coolant and an oil mist are both supplied to the same pipe connected to the main axis, according to the present invention, the coolant remaining within the pipe is removed simultaneously as the tool is being replaced when the coolant is switched to an oil mist. In the following, an example is described where the coolant remaining within the pipe is removed simultaneously as the tool is being replaced by the tool replacing unit 13.

The period of time that is required for the oil mist supplied from the oil mist unit 4 to remove the coolant from the center through coolant pipe 10 is preset as a first predetermined period of time (T1) during which the tool replacing unit 13 is controlled so that the state where the tool 12 is detached from the main axis 11 is maintained during the tool replacing cycle. In order to maintain the state where the tool 12 is detached from the main axis 11 during the first predetermined period of time (T1), the relative movement of the tool 12 maybe stopped in the state where the tool 12 is detached from the main axis 11 or the relative movement of the tool 12 may be slower than the conventional movement of replacing the tool. The state where the tool 12 is detached from the main axis 11 may be referred to when the tool 12 that has been used so far is removed from the main axis 11 or when a tool 12 to be used is attached to the main axis 11.

In order to allow the controller 14 to recognize when the state where the tool 12 is detached from the main axis 11 is present, a signal from a proximity switch in the vicinity of the tool provided within the main axis or a signal representing the angle of the turret in the tool replacing unit can be used.

At least during that time (first predetermined period of time (T1)), the oil mist unit 4 supplies an oil mist into the center through coolant pipe 10. The oil mist supplied into the center through coolant pipe 10 allows the coolant remaining within the center through coolant pipe 10 to be discharged to the outside of the pipe. The tool 12 is not attached to the main axis 11, and thus, the diameter of the center through coolant pipe 10 is greater than the diameter of the pipe within the tool 12, and therefore, the coolant is discharged from the opening of the pipe in the main axis 11 at once In the case where the coolant is switched to an oil mist, the tool 12 is equipped to the main axis 11 after at least the first predetermined period of time (T1) has passed. Here, the oil mist unit 4 may stop the supply of the oil mist once after the first predetermined period of time (T1) has passed or may maintain the supply of the oil mist.

Here, the first predetermined period of time (T1) is described in further detail. In the case where a process using a coolant is shifted to a process using an oil mist, the first predetermined period of time (T1) is required in order for the oil mist discharged from the oil mist unit 4 to discharge the coolant remaining within the center through coolant pipe 10 to the outside of the pipe in the state where the tool 12 is detached from the main axis 11.

Figure 2:
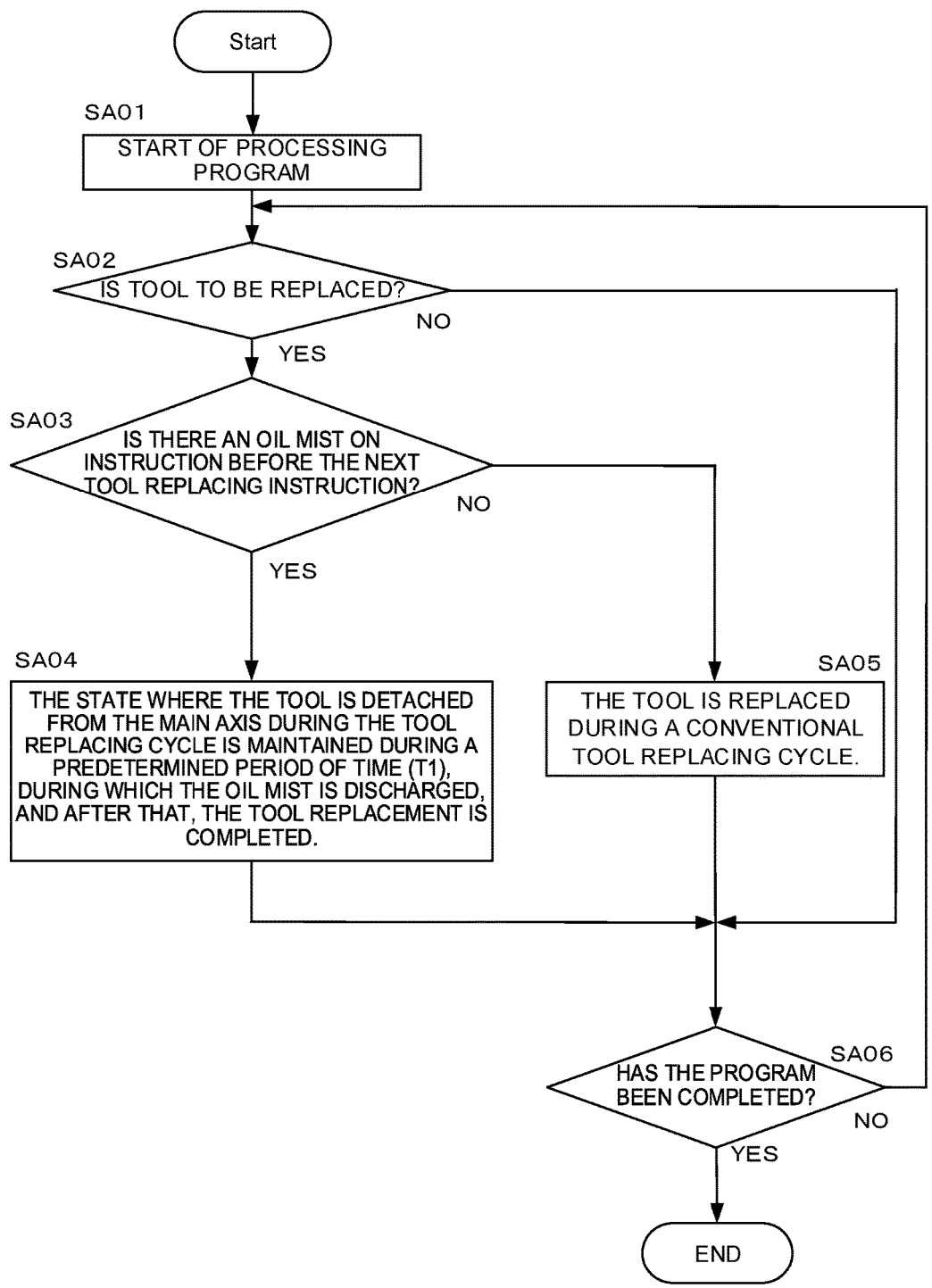
FIG. 2 is a flow chart for the control of discharging the coolant from the piping for the center through coolant while the tool is being replaced.

FIG. 2 is a flow chart for the control of discharging the coolant within the center through coolant pipe while the tool is being replaced. The control on the basis of this flow chart makes it possible to determine whether or not it is necessary to discharge the coolant remaining within the center through coolant pipe 10 while the tool is being replaced.

The following descriptions are in accordance with the steps.

[Step SA01] The process program is started. That is to say, the work process is started in the machine tool.

[Step SA02] It is determined whether or not a tool replacing instruction is given for each block. In the case where a tool replacing instruction is given, the step is shifted to step SA03. In the case where no tool replacing instruction is given, the step is shifted to step SA06.

[Step SA03] In the case where a tool replacing instruction is given, it is determined whether or not an oil mist ON instruction is given before the next tool replacing instruction. In the case where an oil mist ON instruction is given, the step is shifted to step SA04. In the case where no oil mist ON instruction is given, the step is shifted to step SA05.

[Step SA04] During the tool replacing cycle, the state where the tool is detached from the main axis is maintained during the first predetermined period of time (T1), during which the oil mist is discharged and the tool replacement is completed.

[Step SA05] The tool is replaced during a conventional tool replacing cycle, and the step is shifted to step SA06.

[Step SA06] It is determined whether or not the program has been completed. In the case where the program has been completed, the cycle is completed. In the case where the program has not been completed, the step is shifted to step SA02, and it is again determined whether or not a tool replacing instruction is given.

Figure 3:
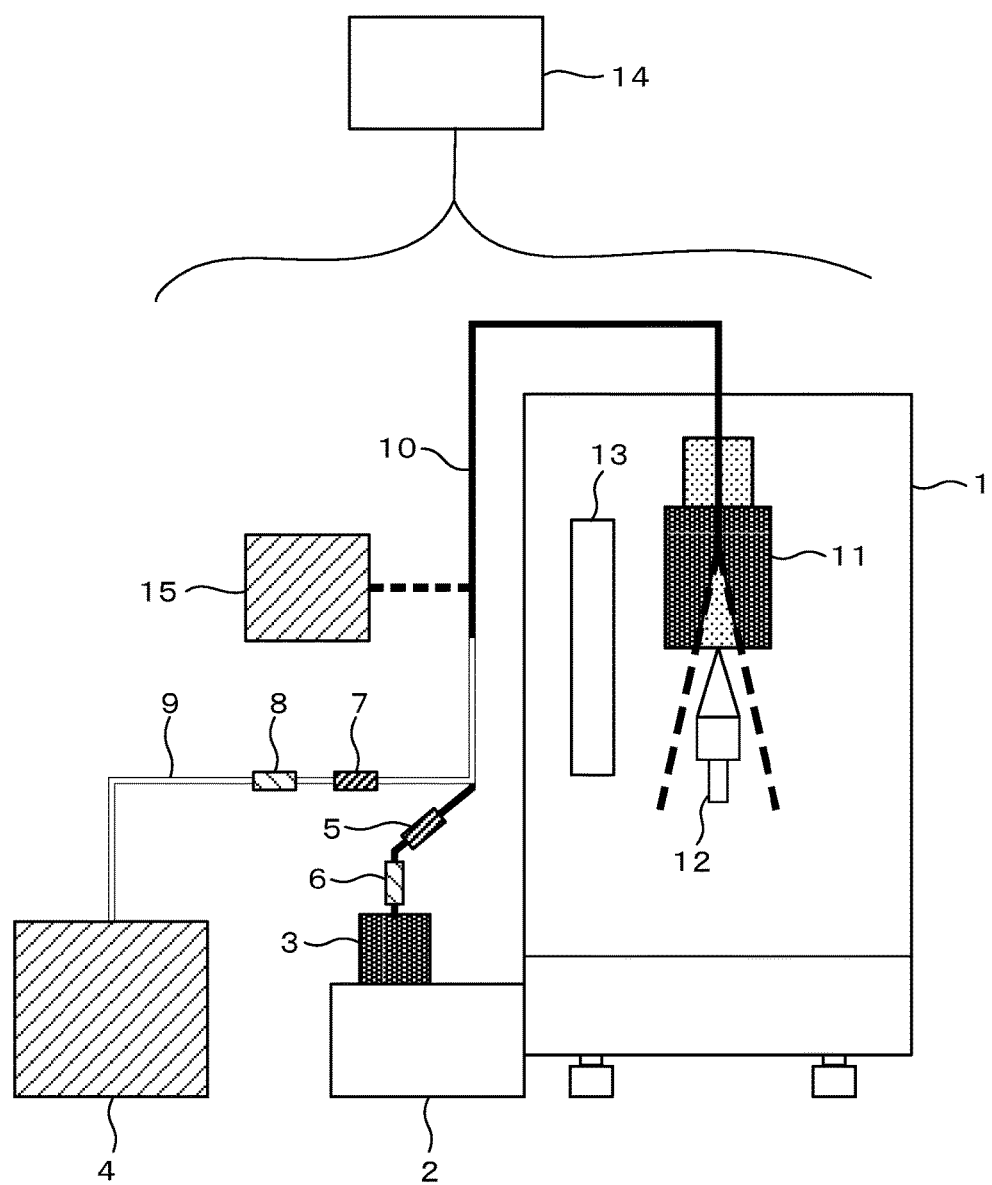
FIG. 3 is a diagram showing the configuration having piping where a center through coolant and an oil mist are both used, and the coolant is sucked up from the piping.

FIG. 3 is a diagram showing the configuration having piping where a center through coolant and an oil mist are both used, and the coolant is sucked up from the piping. Only the points that are different from FIG. 1 are described below. In the configuration in FIG. 3, a suction unit 15 for sucking up the coolant within the pipe is connected to the center through coolant pipe 10. In the configuration in FIG. 3, the remaining coolant is sucked up during a second predetermined period of time (T2) in accordance with an already known suction method such as the use of the suction unit 15 instead of discharging an oil mist.

Here, the second predetermined period of time (T2) is described in further detail. In the case where a process using a coolant is shifted to a process using an oil mist, the second predetermined period of time (T2) is required to remove the coolant from the pipe by allowing the suction unit 15 to suck up the coolant remaining within the center through coolant pipe 10 in a state where the tool 12 is detached from the main axis 11.

Figure 4:
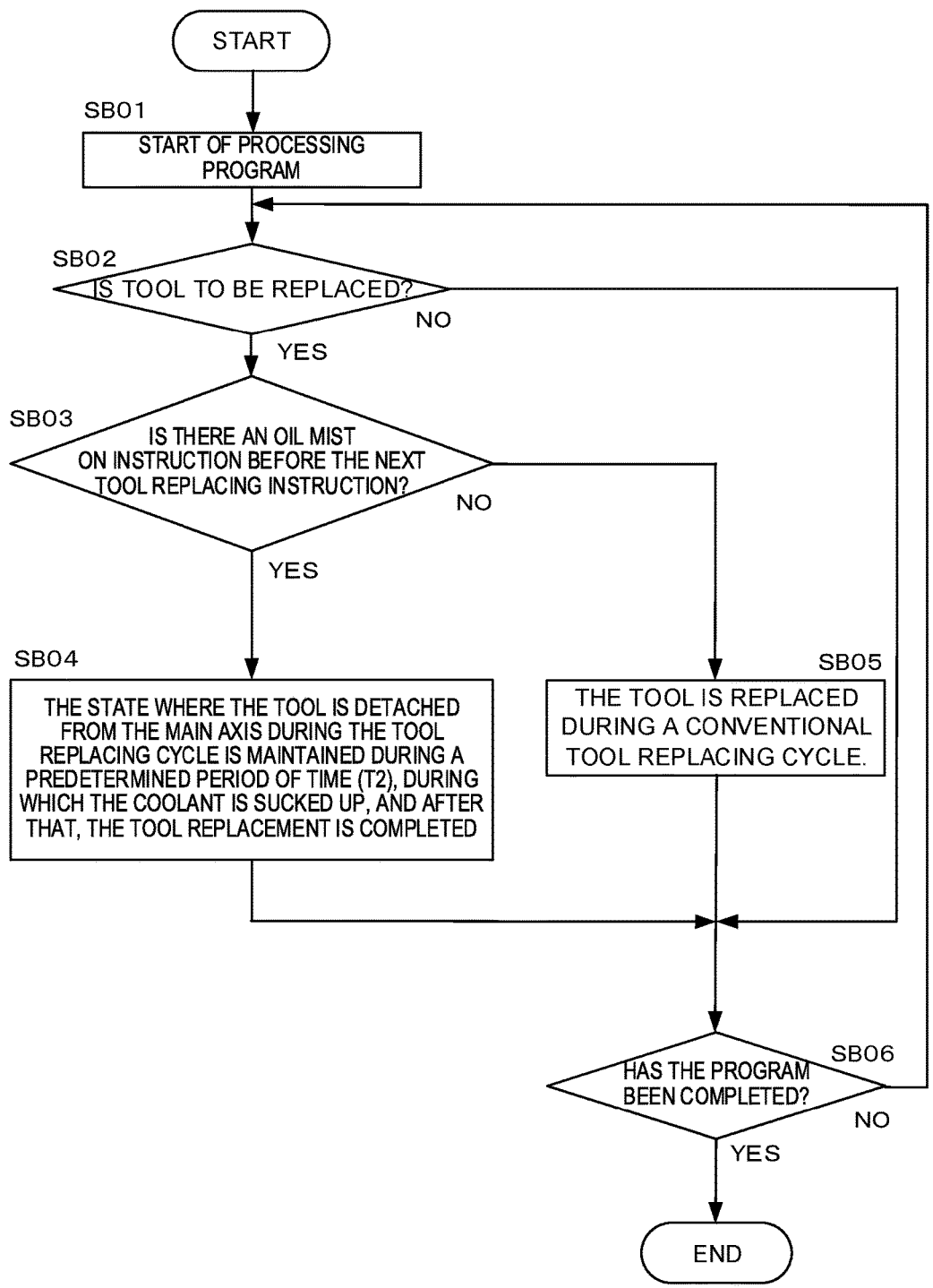
FIG. 4 is a flow chart for the control of sucking up the coolant from the piping for the center through coolant while the tool is being replaced.

FIG. 4 is a flow chart for the control of sucking up the coolant from the center through coolant pipe while the tool is being replaced. The control on the basis of this flow chart makes it possible to determine whether or not it is necessary to suck up the coolant remaining within the center through coolant pipe while the tool is being replaced.

The following descriptions are in accordance with the steps.

[Step SB01] The process program is started. That is to say, the work process is started in the machine tool.

[Step SB02] It is determined whether or not a tool replacing instruction is given for each block. In the case where a tool replacing instruction is given, the step is shifted to step SB03. In the case where no tool replacing instruction is given, the step is shifted to step SB06.

[Step SB03] In the case where a tool replacing instruction is given, it is determined whether or not an oil mist ON instruction is given before the next tool replacing instruction. In the case where an oil mist ON instruction is given, the step is shifted to step SB04. In the case where no oil mist ON instruction is given, the step is shifted to step SB05.

[Step SB04] During the tool replacing cycle, the state where the tool 12 is detached from the main axis 11 is maintained during the second predetermined period of time (T2), during which the coolant is sucked up, the tool replacement is completed, and the step is shifted to step SB06.

[Step SB05] The tool is replaced during a conventional tool replacing cycle, and the step is shifted to step SB06.

[Step SB06] It is determined whether or not the program has been completed. In the case where the program has been completed, the cycle is completed. In the case where the program has not been completed, the step is shifted to step SB02, and it is again determined whether or not a tool replacing instruction is given.

According to the present invention, the coolant remaining within the pipe can be automatically discharged when the tool is being replaced, and therefore, the time and effort spent for programming for the discharge of the coolant can be saved. In the case where an instruction for removing the coolant within the pipe is forgotten to be inputted due to an error in the programming as described above, a problem where the coolant remaining within the pipe is discharged during a certain period of time after an instruction for the oil mist has been given can be prevented. The oil mist can be discharged only during a certain period of time in the state where the tool is disengaged or the coolant remaining within the pipe is sucked up when the tool is being replaced so that the time required for discharging or sucking up the coolant can be shortened in order to vacate the pipe (due to the diameter of the pipe in the main axis being greater than the diameter of the through hole in the tool), and thus, the problem can be avoided.

As disclosed in Patent Document 3 (turret type) and Patent Document 4 (swing arm type), there are various structures for the tool replacing unit for a machine tool. The present invention is applicable to any tool replacing unit in such a manner that the coolant remaining within the pipe can be removed in a state where the tool is detached from the main axis, and thus, the effects of the present invention can be gained.

Though the preferred embodiments of the present invention are described above, the present invention is not limited to these embodiments and can be implemented with other modes by applying an appropriate modification.

The invention claimed is:

1. A controller for a machine tool,
the machine tool including:
   a coolant unit for storing a coolant;
   an oil mist unit for generating an oil mist;
   a main shaft;
   a tool attachable to and detachable from the main shaft; and
   piping for supplying both the coolant and the oil mist to the main shaft, where the coolant and the oil mist are dischargeable from a through hole provided in the tool when said tool is attached to the main shaft,
said controller configured to
   execute a processing program to instruct the discharge of either the coolant or the oil mist,
   confirm existence of a tool replacing instruction in said processing program,
   confirm existence of an oil mist discharge instruction between said tool replacing instruction and a next tool replacing instruction, and
   when the oil mist discharge instruction is confirmed, cause the tool to be maintained in a state where said tool is detached from said main shaft during a predetermined period of time at the time of replacing the tool, and at the same time cause the oil mist to discharge from said oil mist unit into the piping to remove the coolant from said piping during the predetermined period of time.

2. A controller for a machine tool,
the machine tool including:
   a coolant unit for storing a coolant;
   an oil mist unit for generating an oil mist;
   a main shaft;
   a tool attachable to and detachable from the main shaft;
   piping for supplying both the coolant and the oil mist to the main shaft of the tool, where the coolant and the oil mist are dischargeable from a through hole provided in the tool when said tool is attached to the main shaft; and a suction unit for sucking up the coolant remaining in said piping, said controller configured to execute a processing program to instruct the discharge of either the coolant or the oil mist, confirm the existence of a tool replacing instruction in said processing program, confirm the existence of an oil mist discharge instruction between said tool replacing instruction and a next tool replacing instruction, and when the oil mist discharge instruction is confirmed, cause the tool to be maintained in a state where said tool is detached from said main shaft during a predetermined period of time at the time of replacing the tool, and at the same time cause said suction unit to suck up the coolant from said piping to remove the coolant from said piping during the predetermined period of time.

* * * * *